US012031446B2

(12) United States Patent
Kulkarni et al.

(10) Patent No.: US 12,031,446 B2
(45) Date of Patent: Jul. 9, 2024

(54) TURBINE ENGINE SERVICING TOOL AND METHOD FOR USING THEREOF

(71) Applicants: General Electric Company, Schenectady, NY (US); OLIVER CRISPIN ROBOTICS LIMITED, Altrincham (GB)

(72) Inventors: Ambarish J. Kulkarni, Glenville, NY (US); Byron A. Pritchard, Loveland, OH (US); Andrew Crispin Graham, Badminton (GB); Todd William Danko, Niskayuna, NY (US); Bernard P. Bewlay, Niskayuna, NY (US); Henry Ng, Cincinnati, OH (US); Michael E. Eriksen, Milford, OH (US)

(73) Assignees: General Electric Company, Schenectady, NY (US); OLIVER CRISPIN ROBOTICS LIMITED, Altrincham (GB)

( * ) Notice: Subject to any disclaimer, the term of this patent is extended or adjusted under 35 U.S.C. 154(b) by 26 days.

(21) Appl. No.: 17/707,380

(22) Filed: Mar. 29, 2022

(65) Prior Publication Data

US 2023/0313702 A1 Oct. 5, 2023

(51) Int. Cl.

| | |
|---|---|
| ***F01D 25/00*** | (2006.01) |
| ***B08B 1/16*** | (2024.01) |
| ***B08B 1/20*** | (2024.01) |
| ***B08B 1/32*** | (2024.01) |

(52) U.S. Cl.

CPC ............ *F01D 25/002* (2013.01); *B08B 1/165* (2024.01); *B08B 1/20* (2024.01); *B08B 1/32* (2024.01); *F05D 2220/32* (2013.01); *F05D 2230/72* (2013.01)

(58) Field of Classification Search

CPC ............... F01D 25/002; F05D 2220/32; F05D 2230/72; B08B 1/005; B08B 1/02

See application file for complete search history.

(56) References Cited

U.S. PATENT DOCUMENTS

| | | | | |
|---|---|---|---|---|
| 4,365,383 | A | 12/1982 | Bartlett | |
| 5,148,635 | A | 9/1992 | Porter | |
| 5,679,174 | A * | 10/1997 | Buongiorno | B08B 3/02 134/13 |

(Continued)

FOREIGN PATENT DOCUMENTS

| | | |
|---|---|---|
| DE | 102013202616 | 8/2014 |
| DE | 102015006330 | 11/2016 |

(Continued)

*Primary Examiner* — David E Sosnowski
*Assistant Examiner* — Aye S Htay
(74) *Attorney, Agent, or Firm* — Fitch, Even, Tabin & Flannery LLP

(57) ABSTRACT

A servicing tool for a turbine engine and a method for using thereof are provided. A method includes inserting the tool into an access opening of the turbine engine, contacting a blade of the turbine engine, and removing material from the blade. The tool may comprise a wiper mount and a wiper, including a wiper surface, configured to contact and remove material from the blades. The tool may further comprise a body, an actuator, and fluid flowpaths for deploying the wiper and providing fluid locally to the blades of the turbine engine.

20 Claims, 9 Drawing Sheets

(56) References Cited

U.S. PATENT DOCUMENTS

| | | | | |
|---|---|---|---|---|
| 6,036,636 | A * | 3/2000 | Motoki | A61B 1/0057 600/141 |
| 7,033,979 | B2 | 4/2006 | Herwig | |
| 7,497,220 | B2 | 3/2009 | Asplund | |
| 8,028,936 | B2 | 10/2011 | McDermott | |
| 8,277,647 | B2 | 10/2012 | Rice | |
| 8,888,418 | B2 | 11/2014 | Costa et al. | |
| 9,138,782 | B2 | 9/2015 | Dorshimer | |
| 9,739,168 | B2 | 8/2017 | Ekanayake | |
| 9,926,517 | B2 | 3/2018 | Tibbetts | |
| 9,932,854 | B1 | 4/2018 | Tibbetts | |
| 9,951,647 | B2 | 4/2018 | Rawson | |
| 9,957,066 | B2 | 5/2018 | Bewlay | |
| 10,005,111 | B2 | 6/2018 | Eriksen | |
| 10,018,113 | B2 | 7/2018 | Bewlay | |
| 10,024,163 | B2 | 7/2018 | Diwinsky et al. | |
| 10,227,891 | B2 | 3/2019 | Eriksen et al. | |
| 10,323,539 | B2 | 6/2019 | Bewlay | |
| 10,377,968 | B2 | 8/2019 | Brooks | |
| 10,385,723 | B2 | 8/2019 | Flynn | |
| 10,392,964 | B2 | 8/2019 | Griffiths et al. | |
| 10,634,004 | B2 | 4/2020 | Giljohann | |
| 10,669,885 | B2 | 6/2020 | Pecchiol | |
| 10,920,181 | B2 | 2/2021 | Martin | |
| 11,027,317 | B2 | 6/2021 | Tibbetts | |
| 11,028,727 | B2 | 6/2021 | Kulkarni et al. | |
| 11,161,128 | B2 * | 11/2021 | Kulkarni | B05B 1/046 |
| 11,260,477 | B2 | 3/2022 | Huttner | |
| 11,441,446 | B2 | 9/2022 | Rawson | |
| 2005/0204489 | A1 * | 9/2005 | Velez, Jr. | B08B 9/087 15/93.1 |
| 2011/0005554 | A1 * | 1/2011 | Du Plessis | B08B 9/00 29/428 |
| 2014/0069460 | A1 * | 3/2014 | Kell | G02B 23/2423 451/28 |
| 2014/0130583 | A1 * | 5/2014 | Kell | F01D 21/003 73/112.05 |
| 2014/0260308 | A1 * | 9/2014 | Dorshimer | F01D 25/002 60/779 |
| 2015/0159122 | A1 | 6/2015 | Tibbetts | |
| 2017/0165721 | A1 | 6/2017 | Tibbetts | |
| 2017/0167290 | A1 | 6/2017 | Kulkarni | |
| 2017/0191376 | A1 | 7/2017 | Eriksen | |
| 2017/0204739 | A1 | 7/2017 | Rawson | |
| 2017/0254217 | A1 | 9/2017 | Eriksen | |
| 2018/0003060 | A1 | 1/2018 | Lipkin | |
| 2018/0149038 | A1 | 5/2018 | Eriksen | |
| 2018/0155060 | A1 | 6/2018 | Dauenhauer | |
| 2018/0156062 | A1 * | 6/2018 | Dede | B05D 1/02 |
| 2018/0216036 | A1 | 8/2018 | Tibbetts | |
| 2018/0237163 | A1 | 8/2018 | Bewlay | |
| 2018/0245477 | A1 | 8/2018 | Kulkarni | |
| 2018/0258787 | A1 | 9/2018 | Tibbetts | |
| 2018/0291803 | A1 | 10/2018 | Belay | |
| 2018/0298781 | A1 | 10/2018 | Tibbetts | |
| 2018/0313225 | A1 | 11/2018 | Millhaem | |
| 2018/0355751 | A1 | 12/2018 | Tibbetts | |
| 2019/0143350 | A1 * | 5/2019 | Kulkarni | B05B 1/20 239/398 |
| 2019/0153890 | A1 | 5/2019 | Eriksen | |
| 2019/0323378 | A1 | 10/2019 | Tibbetts | |
| 2020/0141269 | A1 | 5/2020 | Rawson et al. | |
| 2021/0108537 | A1 | 4/2021 | Rigg | |
| 2021/0317752 | A1 | 10/2021 | Deja | |
| 2022/0135006 | A1 * | 5/2022 | Graham | G06N 3/044 701/29.6 |
| 2022/0314430 | A1 * | 10/2022 | Graham | B25J 9/06 |

FOREIGN PATENT DOCUMENTS

| | | |
|---|---|---|
| WO | 2020022474 | 1/2020 |
| WO | 2020030516 | 2/2020 |

* cited by examiner

TURBINE ENGINE SERVICING TOOL AND METHOD FOR USING THEREOF

FIELD OF THE DISCLOSURE

The present subject matter relates generally to tools for servicing and/or performing maintenance operations on a component within a turbine engine, and methods for servicing thereof.

BACKGROUND

Servicing and maintaining compressor blades of a turbine engine, specifically the leading edge of a blade in a high-pressure compressor stage, reduces aerodynamic losses in the high-pressure compressor performance. Maintaining compressor blades of a turbine engine, by removing debris, increases efficiency of the compressor and aids in inspection of the surface of the compressor blade.

Servicing compressor blades typically comprises grinding of the blade, specifically the leading edge. The grinding is typically completed at piece-part repair. Maintaining the compressor and/or the compressor blades typically comprises a wash to clear debris from the compressor blades.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1A:
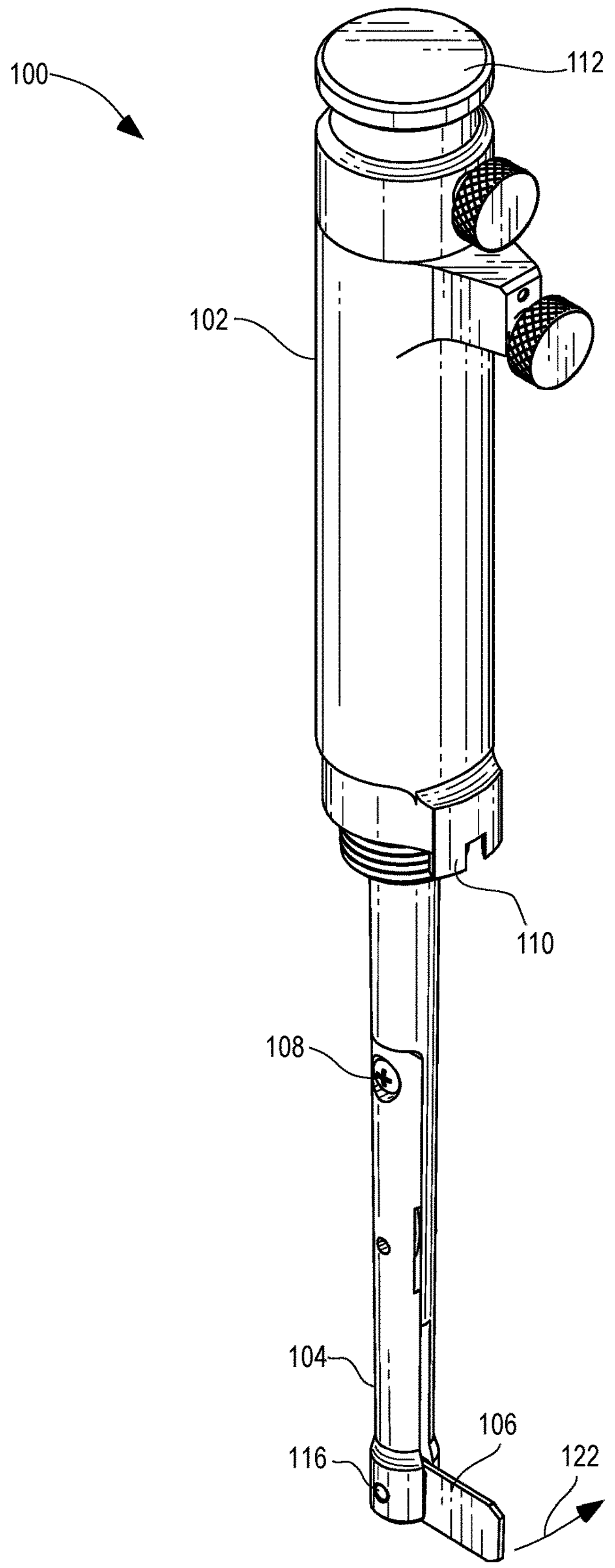
FIG. 1A is a perspective view of a portion of a turbine servicing tool in a deployed configuration according to some embodiments.

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, either or both endpoints defining numerical ranges, and/or the margin for ranges between endpoints. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, the present subject matter relates to a servicing tool and a method for using thereof. The tool may be used for removing material from a blade, more specifically, a compressor blade. The material may be material of the blade itself, such as metal from the leading edge of the blade, or material on the surface of the blade, such as dust, sand, and debris. In some embodiments the tool comprises a fixed or substantially rigid wiper for removing material from the blade. In some embodiments, the tool comprises a flexible or substantially flexible wiper such that the wiper bends upon contact with the blade for removing material from the blade and may remove material from a side of the blade. In some embodiments, the tool may be useful in aiding inspection of the blade without the need to disassemble the engine, either partially or fully.

In some embodiments, the tools and methods described herein provide for increased efficiency of the compressor blades by repairing the geometry of the leading edge of the blade. The tool may repair the geometry of the leading edge by removing material from the leading edge using physical contact between the tool and the blade. This may be achieved through motion between the tool and the blade.

In some embodiments, the tools and methods described herein provide for decreased maintenance time for repairing the geometry of the leading edge of a compressor blade. The tool may be inserted through a borescope opening or some other access opening in a turbine engine, allowing for material to be removed from the blade, decreasing the maintenance time for repairing the geometry of the leading edge. This may be achieved by performing the repair while the blade remains within the engine casing in a substantially assembled state. This may also allow for more efficient repairs to the leading edge geometry of compressor blades.

In some embodiments, the tools and methods described herein provide for reshaping of the leading edge of multiple blades within a compressor, or in some instances, all of the blades within a stage of a turbine engine. The tool may be inserted into a borescope opening or some other access opening in a stage of the turbine engine allowing for reshaping of multiple or all blades within the stage. This may be achieved through relative motion between the blades and the tool. This may also allow for increased efficiency in repairing the leading edge of multiple blades, or in some instances, all of the blades within a stage of the turbine engine.

In some embodiments, the tools and methods described herein provide for reshaping of the full leading edge of one or more compressor blades. This may be achieved through relative motion between the tool and the blades of the turbine engine stage. This may allow for the tool to traverse substantially the full length of the blade.

In some embodiments, the tools and methods described herein provide for increased efficiency of the compressor blades by removing dust and debris from the surface of the blade. This tool may remove material, such as dust and debris, from the surface of a blade through contact between the tool and the blade. This may be achieved through relative motion between the tool and the blade. Removing dust and debris from the surface of the blade may increase efficiency and performance of the compressor.

In some embodiments, the tools and methods described herein provide for decreased cleaning time by removing material, such as dust and debris, from the blades of a turbine engine. This may be achieved by performing the material removal while the blades are in an at least substantially assembled state within the engine. This allows for cleaning at the assembled level and does not require partial or whole disassembly to clean the blades. This may also allow for cleaning on a full stage of blades using relative motion between the tool and blades.

In some embodiments, the tools and methods described herein provide for increased cleaning by removing surface dust and debris from the blades. This is achieved through the physical contact between the tool and the blade. This physical contact may allow for additional cleaning beyond the typical washes used.

In some embodiments, the tools and methods described herein provide for more efficient and effective cleaning when used in conjunction with a cleaning treatment. This is achieved by using the tool while the blades rotate relative to the tool. Some cleaning treatments typically require a time span between when the treatment is used to allow for a chemical reaction of the treatment to remove material. Once the time span has completed, an engine run is typically required to remove the debris loosened during the chemical reaction. Utilizing the tool in conjunction with these treatments while the blades are rotating allows for the removal of material and may not require the engine run to remove the material from the blades. Similar to above, the physical contact used with the cleaning treatment may provide more effective removal of material.

In some embodiments, the tools and methods described herein provide for increased inspection capability. This is achieved by the tool removing material from the surface of the blade. The removal of the material from the surface of the blade exposes the surface of the blade such that the tool or a second tool or device may be utilized to inspect the surface of the blade.

In some embodiments, the tools and methods described herein provide for localized cleaning utilizing fluid in conjunction with the physical contact between the tool and the blades. This is achieved using flowpaths within the tool to provide fluid at or near the point of contact between the tool and the blade. This allows for the application of fluid and other washing substances to be delivered locally to blades of the turbine engine.

Figure 1B:
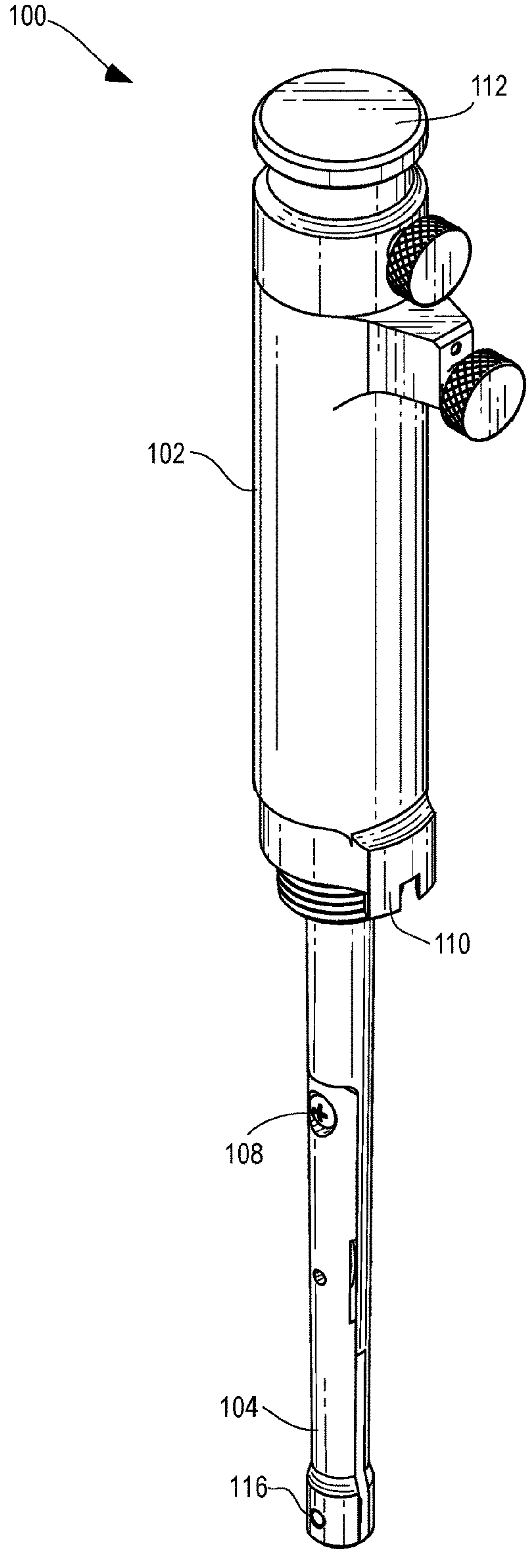
FIG. 1B is a perspective view of a portion of a turbine servicing tool in an undeployed configuration according to some embodiments.
Figure 1C:
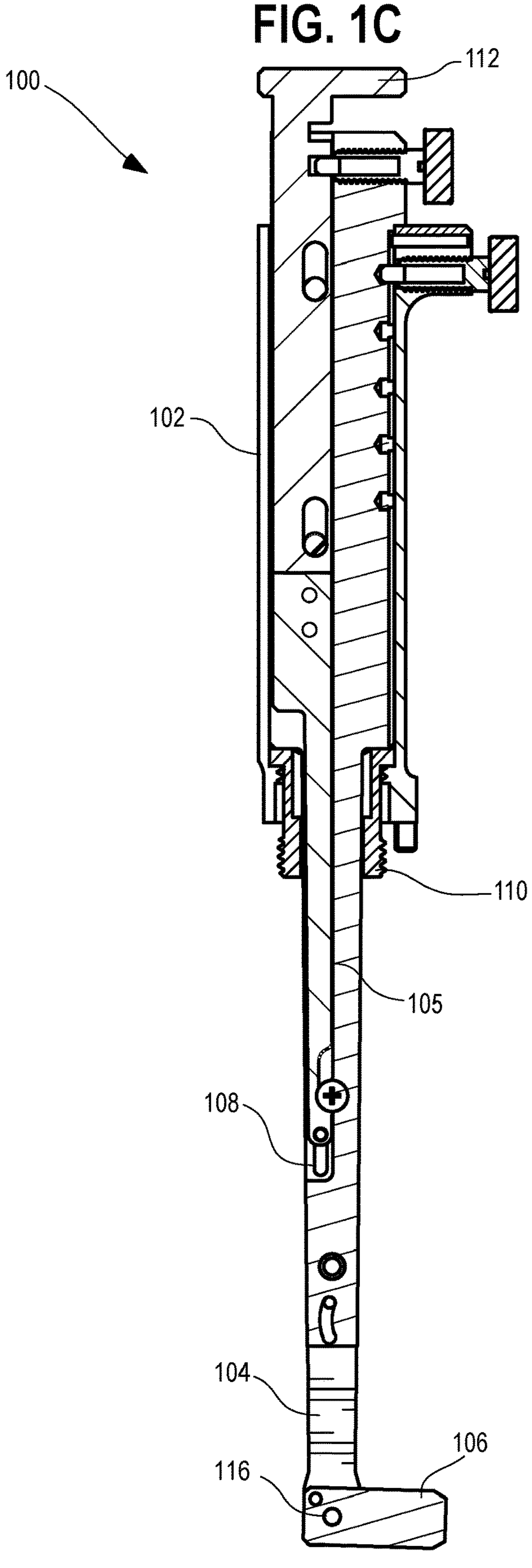
FIG. 1C is a cross-sectional view of a portion of a turbine servicing tool in a deployed configuration according to some embodiments.

Referring now to the drawings, wherein identical numerals indicate the same elements throughout the figures. In FIG. 1A, a perspective view of a servicing tool 100 in a deployed position is illustrated. FIG. 1B is a perspective view of the tool 100 in an undeployed position. FIG. 1C is a cross-section view of the tool 100 in a deployed position.

The service tool 100 may include a body 102, a wiper mount 104, a wiper 106, an actuator 108, a mounting component 110, and a coupling flange 112. In some embodiments, the body 102 may be coupled to the wiper mount 104. The wiper 106 maybe coupled to an end of the wiper mount 104. In some embodiments the wiper 106 may be coupled to the wiper mount 104 via a joint 116. In some embodiments the body 102 may be coupled to the mounting component 110. The wiper mount 104 may be coupled to the mounting component 110. The actuator 108 may be coupled to or contained within the wiper mount 104.

The body 102 may have a proximal end and a distal end. At the distal end of the body 102 is a connection between the body 102, the wiper mount 104, and/or the mounting component 110. A coupling flange 112 may be provided at the proximal end of the body 102. The body 102 may be formed of molded plastic, additively manufactured plastic, overmolded plastic, metal, etc.

The wiper mount 104 may be inserted into a borescope opening or other access opening on the casing of a turbine engine. This allows for the tool 100 to extend into the engine while the body 102 may remain substantially outside of the casing. In some embodiments, the mounting component 110 may be used to secure the body 102 of the tool 100 to the casing of the engine. In other embodiments, the wiper mount 104, body 102, or connection thereof, may secure the tool 100 to the casing of the engine. In some embodiments, the body 102 may be mounted to the casing of the engine such that an insertion path for the wiper mount 104 and wiper 106 is provided.

The mounting component 110 may be threaded such that there is a threaded connection between the mounting component 110 and the borescope opening or other access opening in the engine. Likewise, in embodiments where the body 102 or wiper mount 104 may mount the tool 100 to the casing of the engine, a threaded connection may be provided. While a threaded connection may allow for the tool 100 to be held in a more rigid state, the mounting component 110, body 102, or wiper mount 104 may be made of a material such that a push-fit or otherwise friction contact between the mounting component 110, body 102, or wiper mount 104 and the opening is made. The mounting component 110 may be formed of molded plastic, additively manufactured plastic, overmolded plastic, metal, or some other material to provide a connection between the mounting component 110 and the opening of the engine.

In some embodiments, the actuator 108, as illustrated in FIG. 1C, may be housed within or coupled to the wiper mount 104 or body 102. The actuator 108 may be used to deploy the wiper 106 from an undeployed position, as illustrated in FIG. 1B, to a deployed position, as illustrated by FIG. 1A. The actuator 108 may cause the deployment of the wiper 106 via a physical connection, such as a switch, or through a non-physical connection, such as a magnetic connection. The actuator 108 may be controlled physically, such as a button or some other structure such as a switch connected to the tool, or remotely, via control signals sent over a network between a control device and a processor coupled to or in communication with the tool 100.

The actuator 108 may deploy the wiper 106 after insertion of the tool 100, and more specifically the wiper mount 104, through the access opening. While not required, deploying the wiper 106 after insertion allows for the wiper 106 to be larger than the access opening, thus increasing a useable surface of the wiper 106 to contact a blade of the turbine engine. This also allows for the wiper mount 104 to be larger, which may allow the wiper mount 104 to handle larger pressures and forces caused by the interaction between the wiper 106 and the blade(s). In some embodiments, the wiper 106 may be rigidly mounted to the wiper mount 104 such that the wiper 106 is in a deployed position before and after insertion.

In some embodiments, the wiper mount 104 may be formed of the same or a different material than the body 102 and the wiper 106. The wiper mount 104 may be formed of molded plastic, additively manufactured plastic, overmolded plastic, metal, etc. The wiper mount 104 may be rigid such that the wiper mount 104 does not substantially bend, flex, or otherwise disform when the wiper 106 contacts a blade. The wiper mount 104 may be formed of flexible material such that the wiper mount 104 disforms when the wiper 106 contacts the surface of a blade.

In some embodiments, the tool 100 may include the coupling flange 112. In some embodiments, the coupling flange 112 may be used to deploy the wiper 106 to the deployed positions. In some embodiments, the coupling flange 112 may be utilized to provide a fluid to the wiper 106 or wiper mount 104. The coupling flange 112 may be coupled to the body 102 or the wiper mount 104. The coupling flange 112 may be coupled to an external fluid delivery system. The external fluid delivery system may provide a fluid or other wash to the tool 100. The coupling flange 112 may be connected to internal passages 105, such as fluid flowpaths, throughout the tool 100. In some embodiments, the fluid flowpaths extend from the proximal end of the body 102 to the wiper mount 104 and/or the wiper 106. The fluid flowpaths may fluidly connect the body 102 of the tool 100 to the wiper mount 104, and/or the wiper 106. In some embodiments, the fluid flowpaths may fluidly connect the wiper mount 104 to the fluid delivery system. In some embodiments, the body 102 and the wiper mount 104 may be substantially hollow to provide the fluid flowpaths throughout the tool 100. In some embodiments, the body 102, the wiper mount 104, and/or the wiper 106 may be substantially hollow to provide the fluid flowpaths throughout the tool 100.

In some embodiments, the tool 100, or other external structure, provides relative motion to the wiper 106 and/or wiper mount 104. The relative motion may be provided by an external control system, electrical, hydraulic, or pneumatic sources connected to the coupling flange 112 to apply rotational motion, as illustrated by arrow 122, to the body 102 and/or the wiper mount 104. The relative motion may also be provided by an actuator coupled to the engine via the actuator's accessory gearbox. The relative motion of the wiper 106 and/or the wiper mount 104 relative to the blade allows for removal of material from the blade when contacted by the wiper 106. In some embodiments, the relative motion may be rotational motion between the tool 100 and the blade. The rotational motion may be the rotation motion, as illustrated by arrow 122, of the tool and/or rotation of the blade. In some embodiments, the relative motion may be radial displacement of the tool 100 relative to the blade and/or along the length of the blade. In some embodiments, the relative motion may be rotational motion of the engine, and in turn the blades.

In some embodiments, where rotational motion of the wiper 106 is utilized, the wiper 106 may contact the blades at varying angles and rotational speeds. This may allow for increased control over reshaping the leading edge of the blade, specifically the geometry of the blade while reshaping the leading edge. This may also allow for increased surface contact between the wiper 106 and the blade while removing material such as dust and debris. In some other embodiments, the rotational speed of the wiper 106 may be increased and decreased to allow for more or less material to be removed over a set period of contact time between the wiper 106 and the blade. Further, the contact pressure between the wiper 106 and the blade may be adjusted by increasing or decreasing the rotational speed of the wiper 106.

In some embodiments, the relative motion may come from both the tool 100 and the blade. The rotation of the tool 100 may be provided, as described above and used in conjunction with rotational motion provided by the engine and blades. This may allow the coordination of motion to achieve different speeds, contact angles, and geometries.

In some embodiments, the radial displacement, or depth, of the wiper 106 and/or the wiper mount 104 within the engine may be adjusted by the body 102, the wiper mount 104, or other external structure, such as an external electrical, hydraulic, or pneumatic source. Adjusting the radial displacement of the wiper 106 and/or the wiper mount 104 allows for the wiper 106 to contact more length of the blade, and in some embodiments, substantially all of the length of the blade. This may allow for removal of material from substantially the full length and/or full surface of the blade.

In some embodiments, adjusting the radial displacement of the wiper 106 and/or the wiper mount 104 may allow for displacement of the wiper 106 and/or the wiper mount 104 along the length of the blade. The wiper 106 may be actuated by the wiper mount 104 and/or the body 102 using a lead screw, a ball screw, a belt, a cam, or some other machinal structure. In some embodiments, the radial displacement of the wiper 106 and the wiper mount 104 may adjusted through the actuation of the body 102 using a lead screw, a ball screw, a belt, a cam, or some other machinal structure.

In some embodiments, adjusting the radial displacement of the wiper 106 relative to the blades may be achieved through the interaction of the wiper 106 and the blade. The interaction between the wiper 106 and the blade may advance a nut or shaft in a reversing lead screw to displace the wiper 106 relative to the blade. In some embodiments, rotational motion may be used with radial displacement of the wiper 106. In these embodiments a sprag clutch may be utilized using the combined motion to advance a nut or bearing to adjust the radial displacement.

In some embodiments, the displacement of the wiper 106 relative to the blade may occur in one interaction such that substantially the full length of the blade is covered within the one interaction. In other embodiments, only a portion, less than substantially the full length, of the blade is covered in each interaction between the wiper 106 and the blade.

In some embodiments, adjusting the radial displacement of the wiper 106 relative to the blades may allow for more consistent contact between the wiper 106 and the blade such that the wiper 106 conforms and/or complies to the twist, contour, and/or curvature of the blade.

In some embodiments, the wiper 106 may remain substantially stationary in either rotation, displacement, vibration, or a combination thereof relative to the blade. In these embodiments, the interaction between the wiper 106 and the blade may be controlled by the relative motion, rotation, and/or speed of the blade(s) rotating. In these embodiments, the wiper mount 104 may be formed from a substantially stiff and/or rigid material to maintain proper contact between the wiper 106 and the blade.

In some embodiments, the wiper 106 is formed of a flexible material such as a rubber material. This allows for the wiper 106 to disform when the wiper 106 contacts the blade. The flexible material may allow the wiper 106 to maintain contact with the blade while traversing the length of the blade. The flexible material may also allow the wiper to clean the surface of the blade, including blades with curvatures. In some embodiments, the wiper 106 may contact the leading edge or suction side of the blade. In some embodiments, the wiper 106 may contact the trailing edge or pressure side of the blade. In some embodiments, the wiper 106 may be formed of multiple smaller filaments, such as a brush.

In some embodiments, the wiper 106 may include multiple wipers such that there is more than one wiper. The multiple wipers may be spaced such that each wiper contacts the blade in a substantially sequential order when rotational motion is applied. The multiple wipers may be flexible such that the multiple wipers contact at least one of the pressure side of the blade, the leading edge, and the suction side of the blade in one interaction between the multiple wipers and the blade. The multiple wipers may be comprised of different materials such that different contact angles, contact forces, and/or contact pressures may be achieved from one of the multiple wipers to another.

In some embodiments, the wiper 106 may be formed of stiff material such as molded plastic, additively manufactured plastic, overmolded plastic, metal, etc. In these embodiments stiffness control between the interaction of the wiper 106 and the blade may be adjusted or controlled by the wiper mount 104. In some embodiments the wiper mount 104 may use a torque motor, a pneumatic rotary actuator, or a torsion spring to actively control the torque or force between the wiper 106 and the blade. In other embodiments, the wiper mount 104 may use a rotary damper and speed control to control the torque and force in the interaction between the wiper 106 and the blade. In some embodiments this may be utilized with continuous rotation of the blade, the wiper 106, or a combination thereof. In some embodiments this may be utilized with rotation of the wiper 106 in non-continuous motion.

In some embodiments, a flexible wiper 106 with stiffness control may be utilized. In some embodiments, the wiper 106 may have profiled elastic stiffness along the length of the wiper 106, or an edge thereof. The stiffness of the flexible wiper 106 may also be controlled by using a non-Newtonian fluid built into the wiper 106, or an edge thereof. The wiper 106 stiffness may also be controlled by increasing or decreasing a volume or air entering the wiper 106 or exiting the wiper 106. In some embodiments, the wiper 106 may have a two layer edge with a material, such as damping grease, disposed between the edges to control the stiffness of the wiper 106.

In some embodiments, the wiper 106 may be coated, at least partially with an abrasive coating, as discussed below with reference to FIG. 4. The abrasive coating may be formed of a natural abrasive such as calcite, diamond, iron oxide, sand, feldspar, or emery. The abrasive coating may be a synthetic abrasive such as CBN, ceramics, aluminum oxide, or silicon carbide. The abrasive coating may be bonded abrasives, coated abrasives, or a combination thereof. The abrasive coating may be disposed consistently along the length of the wiper 106 and the edge thereof or may be disposed on certain areas of the wiper 106, or in certain patterns.

In some embodiments, the wiper 106 may have cutting teeth or raised edges on the surface of the wiper 106, or on an edge thereof. The cutting teeth, similar to those of a carpentry file or shaping tool, may have a linear or cross-hatched pattern.

In some embodiments, the wiper 106 may have an unevenly distributed abrasive coating such that the abrasion varies based on the contact position of the wiper 106 relative to the blade. In some embodiments, the highest abrasion disposed on the wiper 106 may match certain needs for contact positioning or angling between the wiper 106 and the blade.

In some embodiments, a continuous feed of a material to the wiper 106 or edge thereof may be passed from a shaft and through the body 102 of the tool 100 to allow the wiper 106 to operate for a longer period of time.

In some embodiments, the tool 100 may be utilized with a fluid wash, mist wash, foam wash, dry detergent wash, or some other wash deployed into at least part of the turbine engine. The washes deployed into the turbine engine aid in the removal of dust and debris from within the turbine engine, as well as dust and debris build up on the blades. The washes may be deployed to a compressor or other stages of the turbine engine through gas flowpaths within the turbine engine. In some embodiments, the tool 100 may include fluid flowpaths to allow for localized deployment of washes.

In some embodiments, the tool 100 may be utilized with a wash housed in a breakable shell. The breakable shell may contain fluid, detergent, or some other substances to aid in the removal of material from the blade. The breakable shell may be broken through the contact interaction between the wiper 106 with the blade, depositing the contents inside to the wiper 106 and the blade.

While water, or water-based washes may be faster or quicker than foam washes, foam washes may be more effective than waster washes. Foam washes utilize chemical reactions between the dust and debris and the wash, or detergent thereof. The chemical reaction may take a period to loosen the dust and debris. Once the chemical reaction has taken place, either fully or partially, an engine run may be used to expel the dust, debris, and any remaining liquid from the turbine engine that has been loosened from the interior of the turbine engine. Water washes sometimes do not utilize a chemical reaction between the wash and the dust and debris, making the wash time shorter, but may still use an engine run to expel water from the engine.

The wiper 106 may aid in the effectiveness and efficiency of the washes. The physical contact between the wiper 106 and the blade may increase the effectiveness of the water wash. The utilization of the wiper 106 while the blades are rotating may allow for the engine run to be occurring while the wiper 106 is used to clean the blades while the blades are rotating. In this embodiment, the rotation of the blades allows for the dust and debris removed or loosened by the foam wash, the wiper 106, or a combination thereof, to be removed from the turbine engine.

In some embodiments, the wiper 106, or wiper surface, may have a smooth surface. The smooth surface may resist fluid penetration into the wiper 106 material. The smooth surface may be disposed continuously across the wiper 106. In some embodiments, the wiper may have a ridged or otherwise textured surface to allow for fluid, material, dust, and debris to pass along the surface of the wiper 106. This may allow for the wiper 106 to clean the surface and not push the fluid, material, dust, or debris along the surface of the blade. In some embodiments, the wiper 106 may be comprised of a porous substance or have a porous surface. The porous surface, such as a sponge, may allow for the wiper to carry fluid along the blade.

Removing material from the blade may allow for increased inspection of the blade. Inspection of the blade may occur concurrently with the tool 100 removing material or subsequently after. Inspection may occur using a device inserted through the borescope opening or some other access opening of the turbine engine. When inspecting, a camera or optical sensor may be used to determine if any damage has occurred to the blade such as surface damage. These devices may be used with structured light to provide and may further include scanning the blade for inspection. Profilometry may be used to inspect the blades.

In some embodiments, the inspection device may be utilized before insertion and utilization of the tool 100 to confirm no damage to the tool 100 may occur. If damage is detected or seen on the blade, the engine may require the removal of the blade or blades.

In some embodiments, the leading edge of the blade may be measured to determine the reprofiling of the geometry of the blade. These methods include profilometry using structured light and an imaging sensor, acoustic scanning, oblique camera angles, or a combination thereof.

Reprofiling the leading edge of the blade may help to improve aerodynamic efficiency. This is due to the dulling over time of the leading edge. As dust, sand, and debris impact the leading edge of a blade, blade erosion may occur. In some instances, the most blade erosion, due to the impacts of the dust, sand, and debris, may occur at the highest angle of incidence of relative motion between the dust and blade surface. The blade erosion may result in a flat and/or blunt geometry or profile. Airflow over the surface may be disrupted around the edges between the blunt leading edge and the adjacent surfaces, causing laminar airflow to separate from the surfaces and to become more turbulent closer to the leading edge. A restored leading edge geometry or profile is less prone to early flow separation and allows improved efficiency compared to a blunt leading edge geometry or profile.

Figure 2:
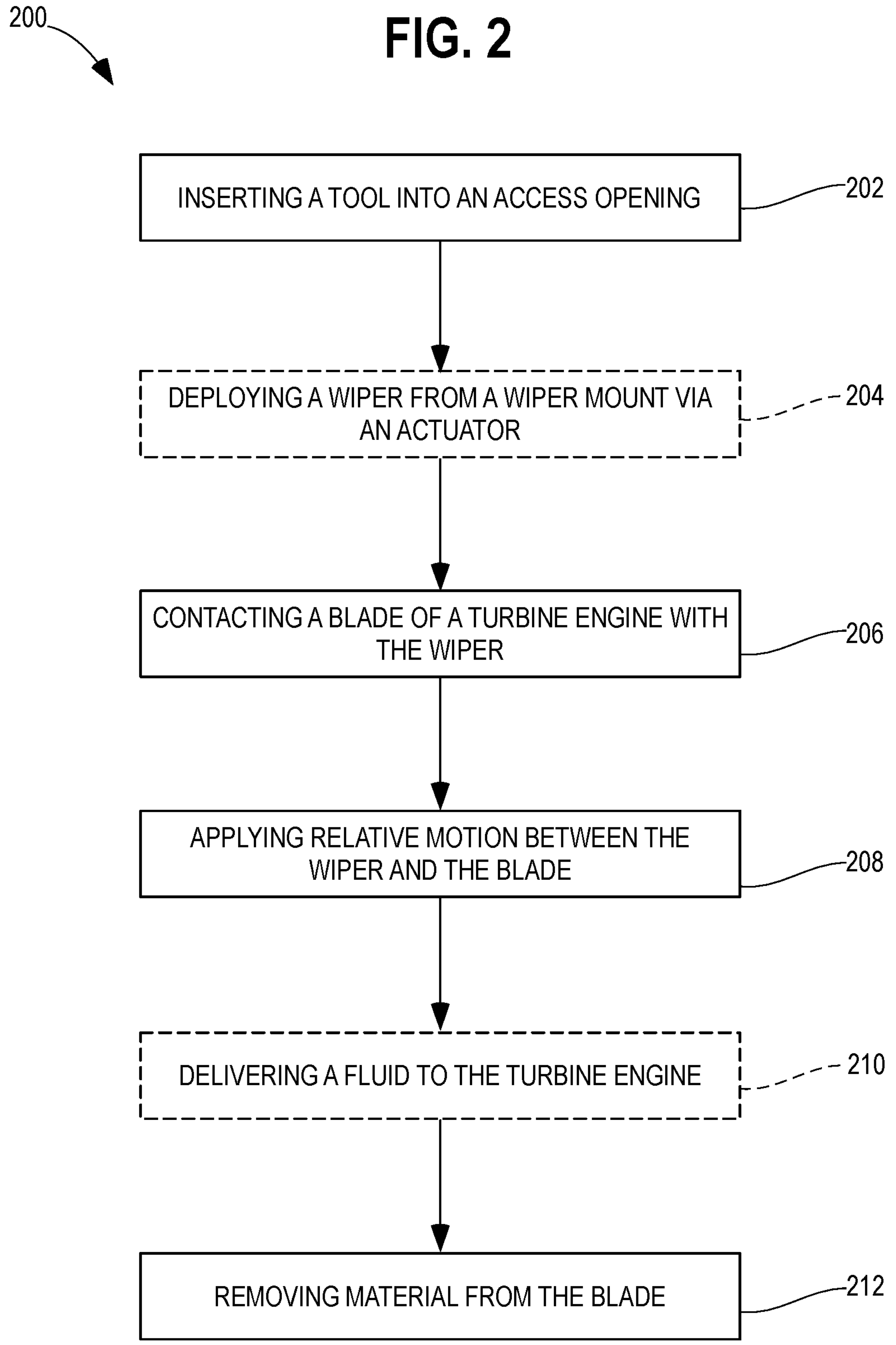
FIG. 2 illustrates a flow diagram of a method for servicing a component of a turbine engine according to some embodiments.

Referring now to FIG. 2, an exemplary method 200, utilizing the tool 100 as discussed above with reference to FIGS. 1A and 1B, is illustrated for removing material from a blade of a turbine engine.

At step 202, the tool 100 is inserted into an access opening of a turbine engine, such as a borescope opening. In some embodiments, the tool 100 may be in an undeployed position having the wiper 106 housed substantially within the wiper mount 104. At optional step 204, the wiper 106 is deployed from the wiper mount 104 via the actuator 108. The deployment of the wiper 106 may be done through a physical contact with the actuator 108 or through a non-physical interaction with the actuator 108. Step 204 may not be utilized with embodiments having the wiper 106 rigidly fixed to the wiper mount 104.

At step 206, the wiper 106 contacts the blade of the turbine engine. At step 208, a relative motion, similar to that described above, may be applied between the wiper 106 and the blade. This may allow the wiper 106 to rotate relative to the blade, the blade to rotate relative to the wiper 106, the wiper 106 to radially displace relative to the blade, or a combination thereof. The rotational speed of the interaction between the wiper 106 and the blade may change or be consistent based on the usage of the wiper 106 and desired interaction between the wiper 106 and the blade. Likewise, the radial displacement speed of the interaction between the wiper 106 and the blade may change or be consistent based on the usage of the wiper 106 and desired interaction between the wiper 106 and the blade.

At optional step 210, a fluid may be delivered to the turbine engine. The fluid may be delivered locally via passages 105, such as flowpaths within the tool 100, as described above. In some embodiments, the fluid may be delivered through flowpaths within the turbine engine. In some embodiments, the fluid may be delivered through the access opening the tool 100 is inserted into, or other access openings within the turbine engine.

At step 212, the wiper 106 removes material from the blade. The material removed may be material from the blade itself, dust, or other debris on the blade. If material from the blade itself is removed, the material may be removed in such a way to repair or reshape the geometry of the blade. This may include reshaping the leading edge of the blade.

Figure 3:
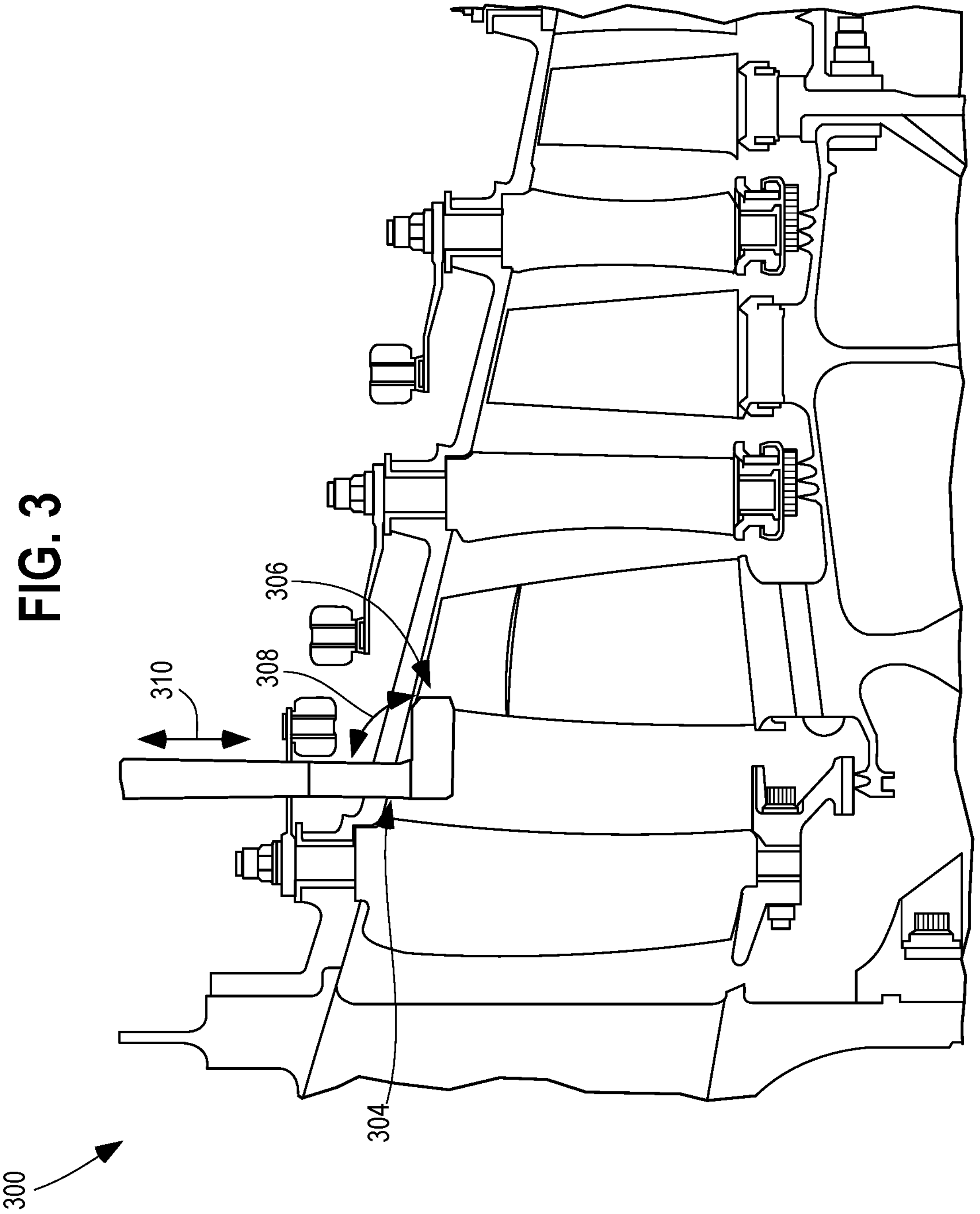
FIG. 3 is a cross-sectional view of a portion of a servicing tool being inserted and deployed inside a turbine engine according to some embodiments.

Referring now to FIG. 3, a stage 300 of a turbine engine is shown. A portion of a tool, such as a wiper mount 304, is shown being inserted into the stage 300 of the turbine engine via the motion illustrated by the arrow 310. The wiper mount 304, may house a wiper 306. Once inserted, the wiper 306 may be moved from a undeployed position, such that the wiper 306 is substantially aligned with the wiper mount 304, to a deployed position, as illustrated via the motion illustrated by the arrow 308. The deployed position may have the wiper 306 substantially perpendicular to the wiper mount 304, however, the deployed position may include the wiper 306 being in a substantially non-parallel position to the wiper mount 304. In some embodiments, as illustrated in FIG. 3, the tool may not be mounted to the casing of the turbine engine.

Figure 4:
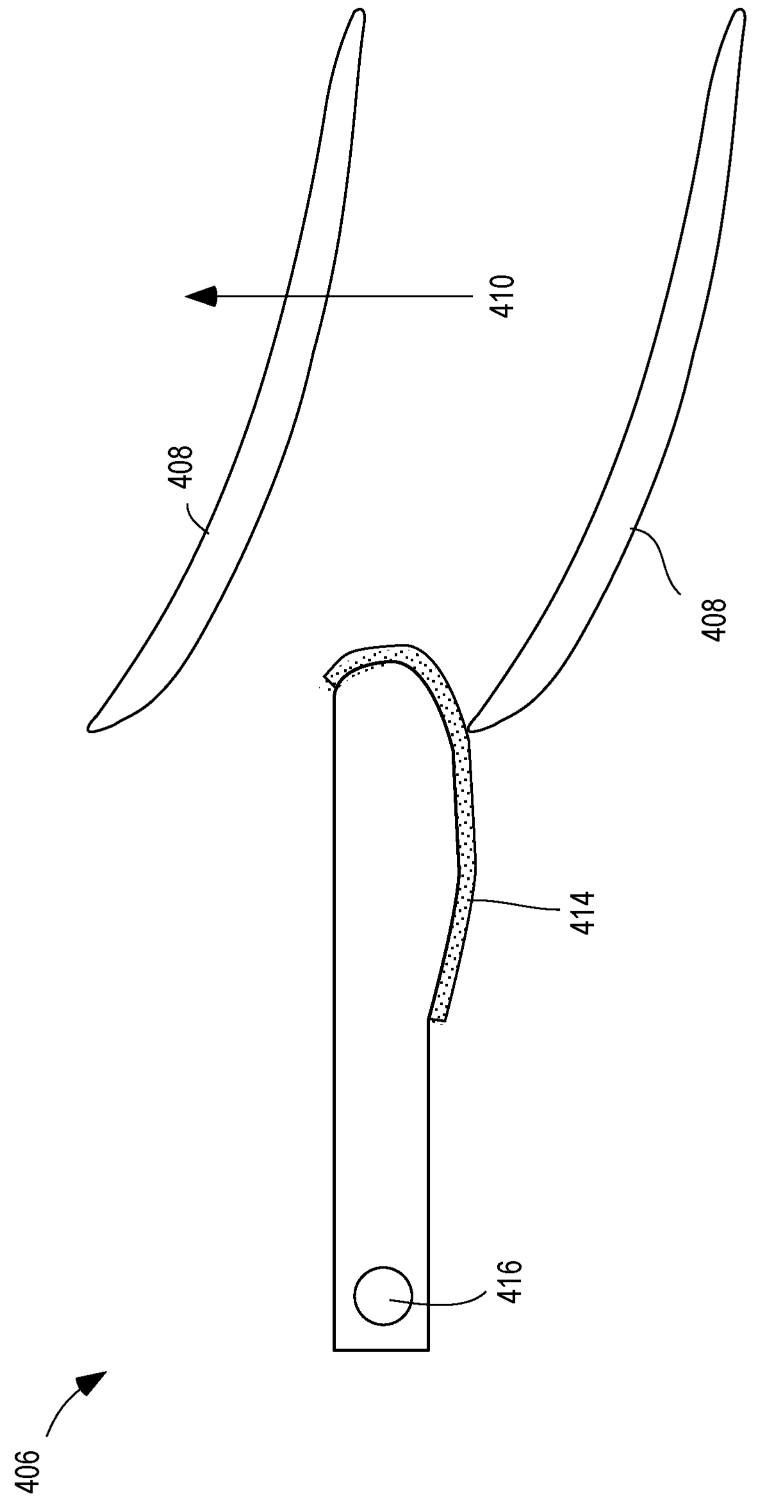
FIG. 4 is a perspective view of a portion of a servicing tool contacting a turbine engine blade according to some embodiments.

Referring now to FIG. 4, a wiper 406 is illustrated. The wiper 406 may have a joint 416. The joint 416 may be used to deploy the wiper 406, similar to deployment described above. The joint 416 may allow for control over the interaction between the wiper 406 and a blade 408. The wiper 406, or a wiper surface thereof, may have a contact surface material 414. The contact surface material 414 may be an abrasive material as described above to remove material from the blade. The contact surface material 414 may be formed of the same material as the wiper 406. The contact surface material 414 may be a continuous surface along the wiper 406, or the contact surface material 414 may be non-continuous.

In some embodiments, material may be removed from the blade 408 through relative motion between the wiper 406 and the blade 408. In this embodiment, the blade(s) 408 are rotated relative to the wiper 406 via the motion indicated by the arrow 410.

Figure 5:
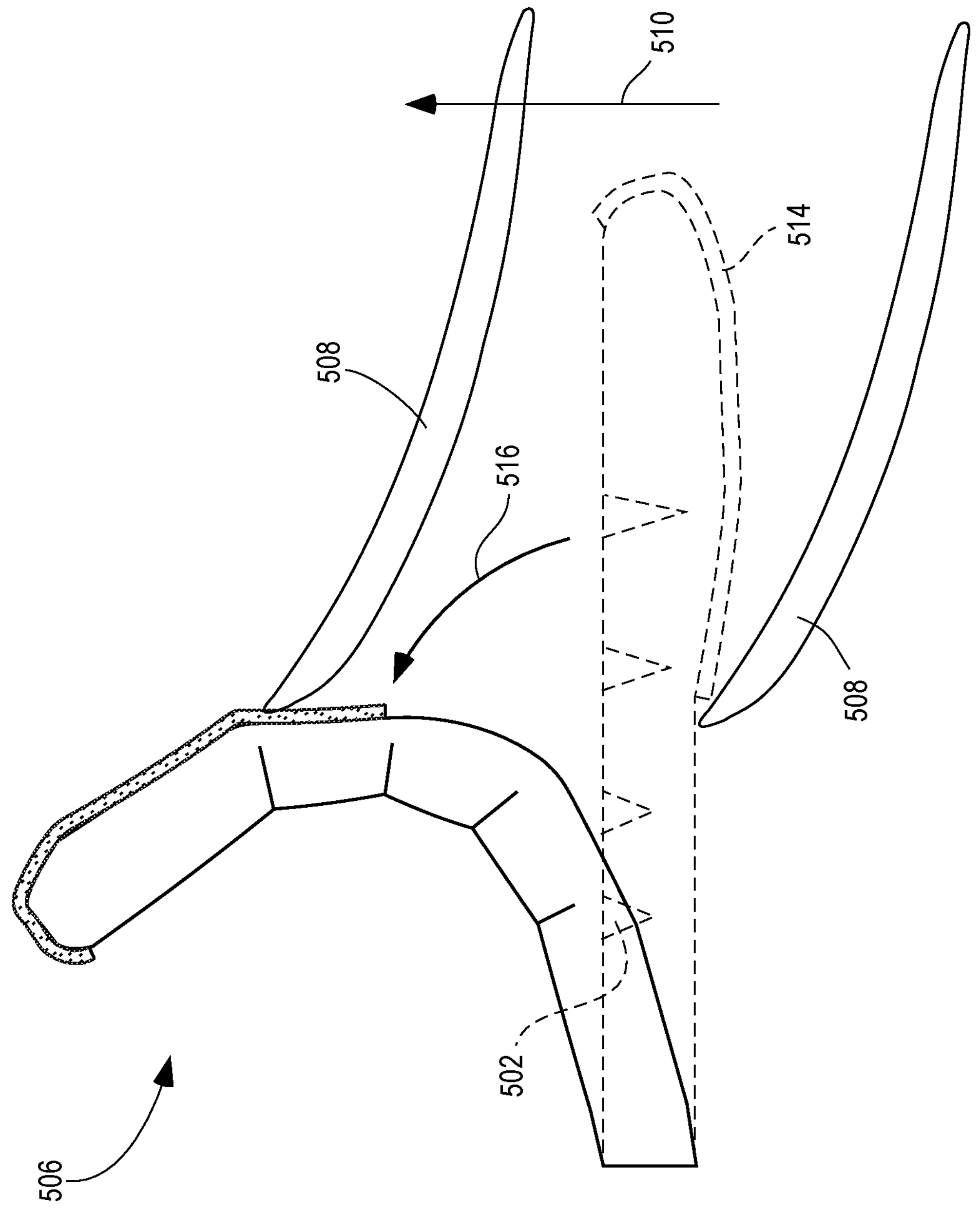
FIG. 5 is a perspective view of a portion of a servicing tool contacting a turbine engine blade according to some embodiments.

Referring now to FIG. 5, a wiper 506 is illustrated. The wiper 506 may have structural compliance cut-outs 502. The structural compliance cut-outs 502 may allow for increased control over an interaction between the wiper 506 and a blade 508. The control may include changing the amount of surface contract pressure, or force thereof, between the wiper 506 and the blade 508. This may also include the wiper 506 disforming in such a way to contact more surface, or a different surface, of the blade 508. The wiper 506 disforming from a first state (shown in dash) to a second state (shown in solid lines) due to the interaction between the wiper 506 and the blade 508 is illustrated via the arrow 516.

The wiper 506, or wiper surface thereof, may also have a contact surface material 514. The contact surface material 514 may be an abrasive material as described above to remove material from the blade. The contact surface material 514 may be formed of the same material as the wiper 506. The contact surface material 514 may be a continuous surface along the wiper 506, or the contact surface material may be non-continuous.

In some embodiments, material may be removed from the blade 508 through relative motion between the wiper 506 and the blade 508. In this embodiment, the blade(s) 508 are rotated relative to the wiper 506 via the motion indicated by the arrow 510.

Figure 6:
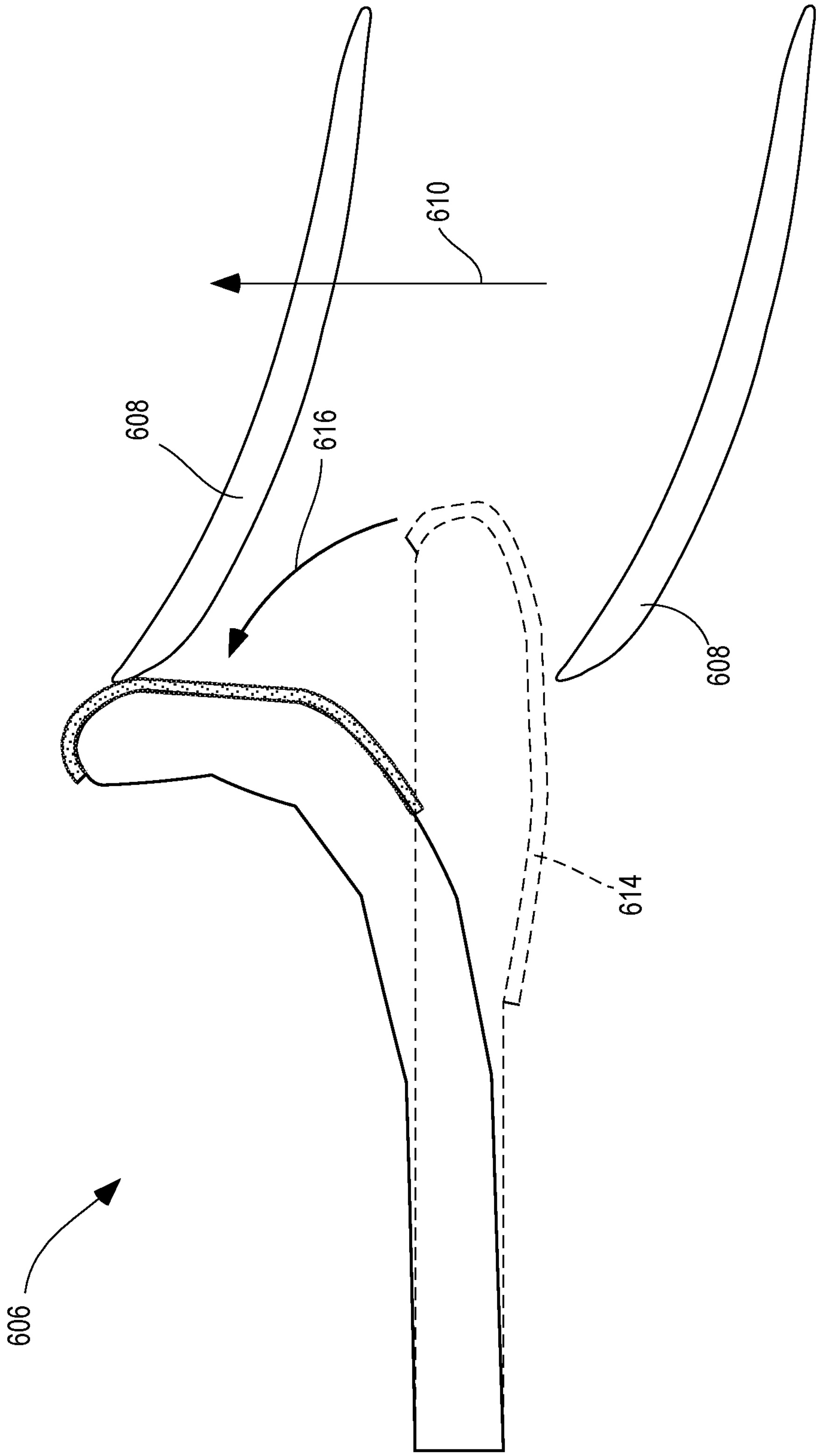
FIG. 6 is a perspective view of a portion of a servicing tool contacting a turbine engine blade according to some embodiments.

Referring now to FIG. 6, a wiper 606 is illustrated. The wiper 606 may have material compliance such that the wiper 606 disforms from a first state (shown in dash) to a second state (shown in solid lines) due to the interaction between the wiper 606 and the blade 608. The disforming or deformation of the wiper 606 due to the interaction between the wiper 606 and the blade 608 is illustrated via the arrow 616. The material compliance of the wiper 606 may allow for the wiper 606 to contour to the curvature of the blade 608 to increase the surface contact of the wiper 606 and the blade 608. The material compliance of the wiper 606 may be changed to allow for control over the amount of material removed from the blade 608. A wiper 606 with higher material compliance may remove less material, or deform more, when contacted by the blade 608. A wiper 606 with a lower material compliance may remove more material, or deform less, when contacted by the blade 608.

The wiper 606 may also have a contact surface material 614. The contact surface material 614 may be an abrasive material as described above to remove material from the blade. The contact surface material 614 may be formed of the same material as the wiper 606. The contact surface material 614 may be a continuous surface along the wiper 606, or the contact surface material may be non-continuous.

In some embodiments, material may be removed from the blade 608 through relative motion between the wiper 606 and the blade 608. In this embodiment, the blade(s) 608 are rotated relative to the wiper 606 via the motion indicated by the arrow 610.

Figure 7:
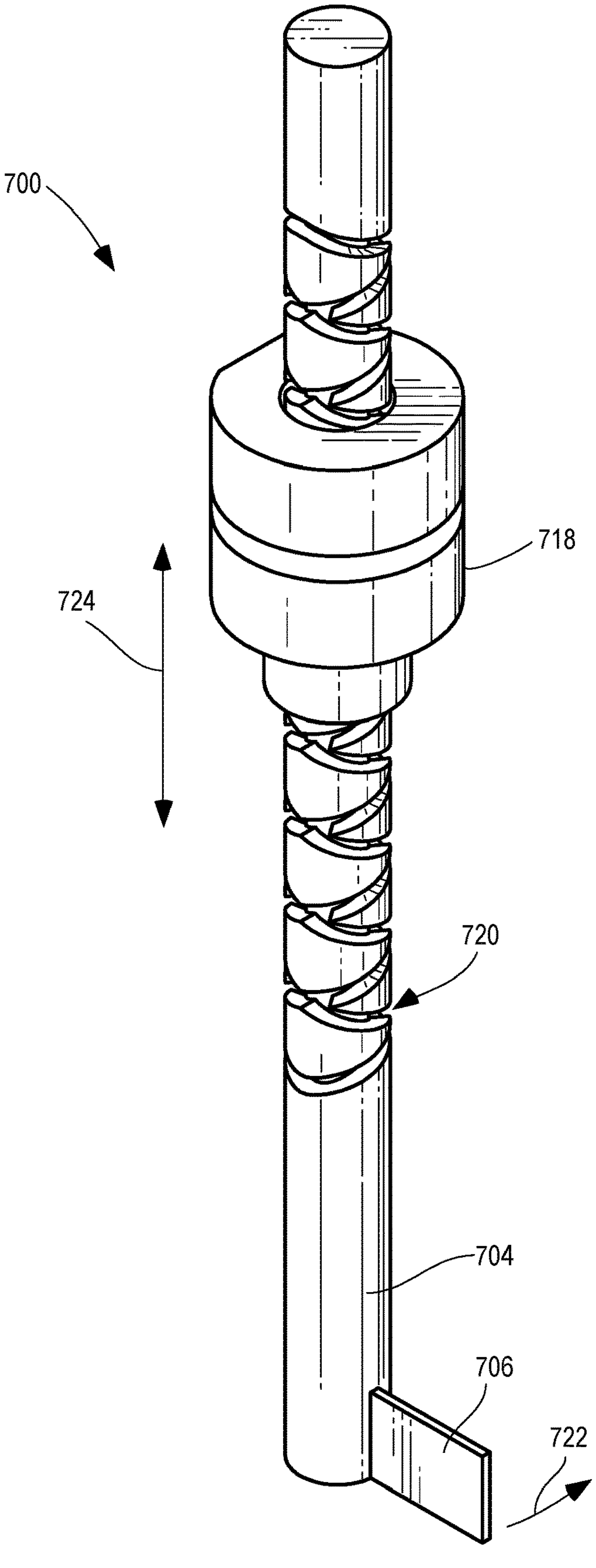
FIG. 7 is a perspective view of a reverse drive wiper mount according to some embodiments.

Referring to FIG. 7, a reverse drive wiper mount 700 is illustrated. The reverse drive wiper mount 700 may include the wiper 706, a wiper mount 704 having reverse threading 720 and a reversing nut 718. The reverse drive wiper mount 700 may be utilized to adjust the radial displacement, as illustrated by the arrow 724, of the wiper 706 within the engine. The radial position of the wiper 706 may correspond to a position along the length of the blade and/or the edge of the blade such that the wiper can cover substantially the entire length of the blade and/or edge of the blade. In some embodiments, the reverse drive wiper mount 700 may be utilized to adjust the radial displacement, as illustrated by the arrow 724, while the wiper 706 is rotated, as illustrated by the arrow 722.

Further aspects of the disclosure are provided by the subject matter of the following clauses:

A turbine engine servicing tool comprising a wiper mount; and a wiper coupled to the wiper mount, the wiper including a wiper surface; wherein when the wiper mount is inserted into an access opening of a gas turbine engine, the wiper surface of the wiper is configured to contact a blade of the gas turbine engine and remove material or debris from the blade via relative motion between the blade and the wiper.

The turbine engine servicing tool of any preceding clause, further comprising an actuator coupled to the wiper mount configured to deploy the wiper from an undeployed position to a deployed position.

The turbine engine servicing tool of any preceding clause, wherein the wiper is fixedly coupled to the wiper mount.

The turbine engine servicing tool of any preceding clause, wherein the wiper is movably coupled to the wiper mount.

The turbine engine servicing tool of any preceding clause, further comprising a body coupled to the wiper mount configured to mount the tool in a position relative to the access opening of the gas turbine engine.

The turbine engine servicing tool of any preceding clause, further comprising a body providing an insertion path for the wiper mount and the wiper.

The turbine engine servicing tool of any preceding clause, further comprising a passage within the wiper mount and the wiper, wherein a fluid is delivered into the gas turbine engine through the passage.

The turbine engine servicing tool of any preceding clause, further comprising a coupling flange coupled to the wiper mount, wherein the coupling flange fluidly couples with an external fluid delivery system in fluid communication with the wiper mount to provide the fluid to the tool.

The turbine engine servicing tool of any preceding clause, wherein the wiper surface is at least one of a textured surface, a smooth surface, and a porous surface, wherein the wiper surface is capable of storing or delivering a fluid for removing material from the blade.

The turbine engine servicing tool of any preceding clause, wherein the relative motion to the blade comprises at least one of radial displacement, rotation, and vibration.

The turbine engine servicing tool of any preceding clause, wherein the wiper comprises a plurality of filaments or a flexible material.

A method for servicing a gas turbine engine comprising: inserting a tool into an access opening of the gas turbine engine, the tool comprising: a wiper mount; and a wiper coupled to the wiper mount, the wiper including a wiper surface; contacting a blade of the gas turbine engine with the wiper; and removing material or debris from the blade via a relative motion between the blade and the wiper.

The method of any preceding clause, wherein the motion comprises adjusting a position of the wiper relative to the blade by rotating the wiper.

The method of any preceding clause, wherein the motion comprises adjusting a position of the wiper relative to the blade by rotating a blade.

The method of any preceding clause, wherein the motion comprises adjusting a position of the wiper relative to the blade controlled by a control system coupled to the tool.

The method of any preceding clause, wherein the wiper surface is at least one of a textured surface, a smooth surface, and a porous surface, wherein the wiper surface is capable of storing or delivering a fluid for removing material from the blade.

The method of any preceding clause, wherein the tool further comprises a body coupled to the wiper mount configured to mount the tool in a position relative to the access opening of the gas turbine engine.

The method of any preceding clause, wherein a fluid is delivered to the gas turbine engine through a passage within at least one of the wiper mount and the wiper.

The method of any preceding clause, further comprising delivering a fluid to the gas turbine engine through a gas flow path of the gas turbine engine.

The method of any preceding clause, wherein the wiper further comprises a plurality of filaments or a flexible material.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A turbine engine servicing tool comprising:
- a wiper mount;
- a wiper coupled to the wiper mount, the wiper including a wiper surface;
- a lead screw coupled to the wiper mount to provide relative motion between a blade of a gas turbine engine and the wiper; and
- an actuator coupled to the wiper mount and configured to deploy the wiper from an undeployed position to a deployed position about a joint, wherein, in the undeployed position, the wiper is substantially aligned with the wiper mount, and in the deployed position, the wiper is substantially perpendicular to the wiper mount;
- wherein when the wiper mount is inserted into an access opening of the gas turbine engine, the wiper surface of the wiper is configured to contact the blade of the gas turbine engine and remove material or debris from the blade via the relative motion between the blade and the wiper.

2. The tool of claim 1, further comprising a body coupled to the wiper mount configured to mount the tool in a position relative to the access opening of the gas turbine engine.

3. The tool of claim 1, further comprising a body providing an insertion path for the wiper mount and the wiper.

4. The tool of claim 1, wherein the wiper surface is at least one of a textured surface, a smooth surface, and a porous surface, wherein the wiper surface is capable of storing or delivering a fluid for removing material from the blade.

5. The tool of claim 1, wherein the relative motion to the blade comprises at least one of radial displacement, rotation, and vibration.

6. The tool of claim 1, wherein the wiper comprises a plurality of filaments or a flexible material.

7. The tool of claim 1, wherein the lead screw comprises a reversing lead screw.

8. A method for servicing a gas turbine engine comprising:
- inserting a tool into an access opening of the gas turbine engine,
- the tool comprising:
  - a wiper mount; and
  - a wiper coupled to the wiper mount, the wiper including a wiper surface;
- contacting at least one of a plurality of blades of the gas turbine engine with the wiper;
- removing material or debris from at least one of the plurality of blades via a relative motion between the plurality of blades and the wiper; and
- rotating the plurality of blades while the wiper is inserted, wherein the relative motion includes the wiper contacting the plurality of blades, resulting in an adjustment of a position of the wiper relative to the rotating plurality of blades via a lead screw coupled to the wiper mount.

9. The method of claim 8, wherein the relative motion further comprises adjusting the position of the wiper relative to the plurality of blades by rotating the wiper.

10. The method of claim 8, wherein the wiper surface is at least one of a textured surface, a smooth surface, and a porous surface, wherein the wiper surface is capable of storing or delivering a fluid for removing material from at least one of the plurality of blades.

11. The method of claim 8, wherein the tool further comprises a body coupled to the wiper mount configured to mount the tool in a position relative to the access opening of the gas turbine engine.

12. The method of claim 8, further comprising delivering a fluid to the gas turbine engine through flow path of the gas turbine engine.

13. The method of claim 8, wherein the wiper further comprises a plurality of filaments or a flexible material.

14. The method of claim 8, wherein the relative motion further comprises adjusting the position of the wiper relative to the plurality of blades controlled by an electrical, hydraulic, or pneumatic source coupled to the tool.

15. A turbine engine servicing tool comprising:
- a wiper mount;
- a wiper coupled to the wiper mount, the wiper including a wiper surface;
- a ball screw coupled to the wiper mount to provide relative motion between a blade of a gas turbine engine and the wiper; and
- an actuator coupled to the wiper mount and configured to deploy the wiper from an undeployed position to a deployed position about a joint, wherein, in the undeployed position, the wiper is substantially aligned with the wiper mount, and in the deployed position, the wiper is substantially perpendicular to the wiper mount;
- wherein when the wiper mount is inserted into an access opening of the gas turbine engine, the wiper surface of the wiper is configured to contact the blade of the gas turbine engine and remove material or debris from the blade via a relative motion between the blade and the wiper.

16. The tool of claim 15, further comprising a body coupled to the wiper mount configured to mount the tool in a position relative to the access opening of the gas turbine engine.

17. The tool of claim 15, further comprising a body providing an insertion path for the wiper mount and the wiper.

18. The tool of claim 15, wherein the wiper surface is at least one of a textured surface, a smooth surface, and a porous surface, wherein the wiper surface is capable of storing or delivering a fluid for removing material from the blade.

19. The tool of claim 15, wherein the relative motion to the blade comprises at least one of radial displacement, rotation, and vibration.

20. The tool of claim 15, wherein the wiper comprises a plurality of filaments or a flexible material.

* * * * *